United States Patent [19]

Kindig et al.

[11] 3,983,567
[45] Sept. 28, 1976

[54] PRESSURE ROLLER ASSEMBLY FOR SELF PROCESSING CAMERA

[75] Inventors: Guilford E. Kindig; James E. Dierks, both of Rochester, N.Y.

[73] Assignee: Eastman Kodak Company, Rochester, N.Y.

[22] Filed: Feb. 20, 1975

[21] Appl. No.: 551,445

[52] U.S. Cl. ............................... 354/86; 354/304
[51] Int. Cl.² .................................. G03B 17/50
[58] Field of Search ............... 354/85, 86, 301, 84, 354/304, 83

[56] References Cited
UNITED STATES PATENTS

| | | | |
|---|---|---|---|
| 2,991,702 | 7/1961 | Eloranta | 354/86 |
| 3,693,521 | 9/1972 | Harvey | 354/86 |
| 3,699,862 | 10/1972 | Kindig | 354/86 |
| 3,745,904 | 7/1973 | Bing | 354/86 |

Primary Examiner—Monroe H. Hayes
Attorney, Agent, or Firm—T. H. Close

[57] ABSTRACT

A pressure roller assembly for use in a camera of the type adapted to expose and process self developing film units includes a pair of rollers held in juxtaposed relation within a frame having open ended slots for receiving the ends of the rollers. Unimpeded radial displacement of the rollers away from each other is limited by a pair of bearing blocks blocking the open ends of the roller receiving slots. The bearing blocks are urged toward the rollers by a bow shaped spring having arms adapted to engage the frame to hold the spring under tension against the bearing blocks. The ends of the bow shaped spring bear against the bearing blocks at a point contact.

6 Claims, 10 Drawing Figures

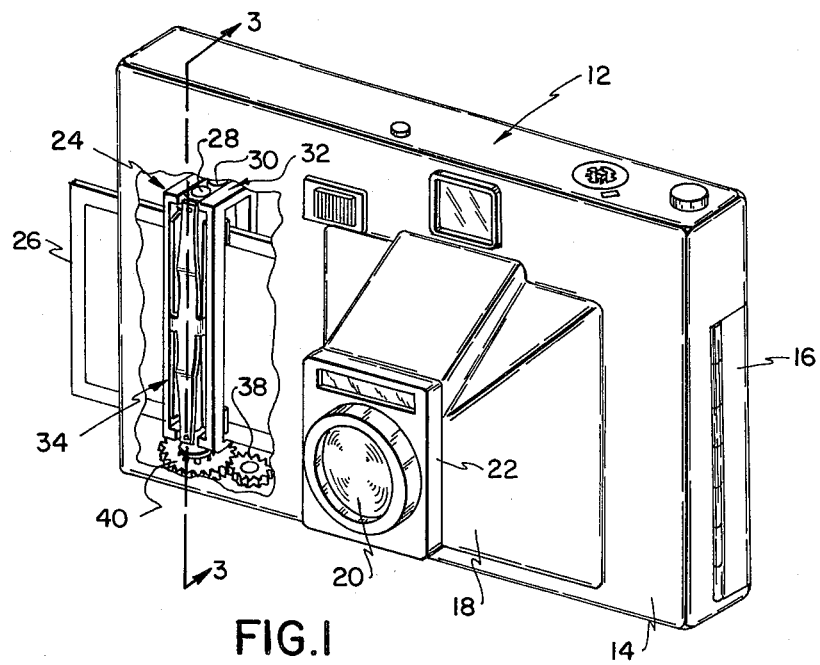
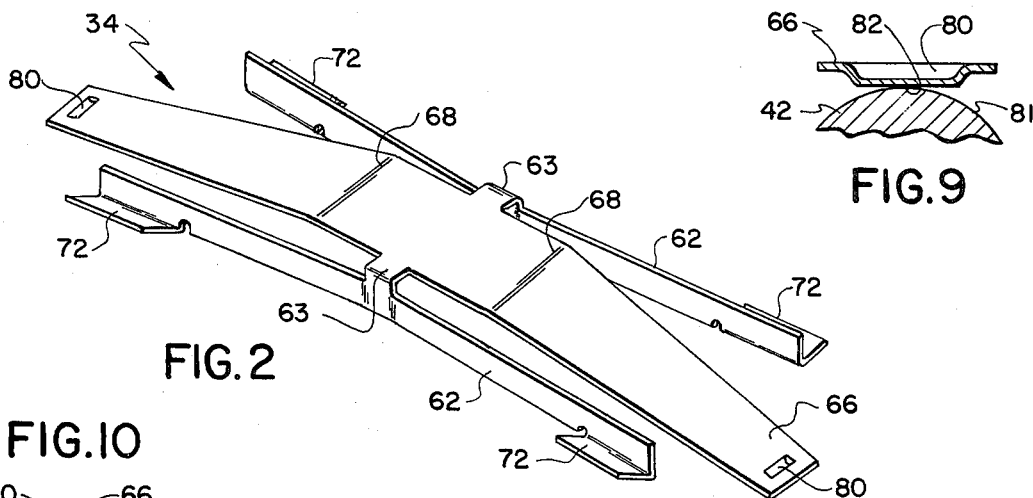
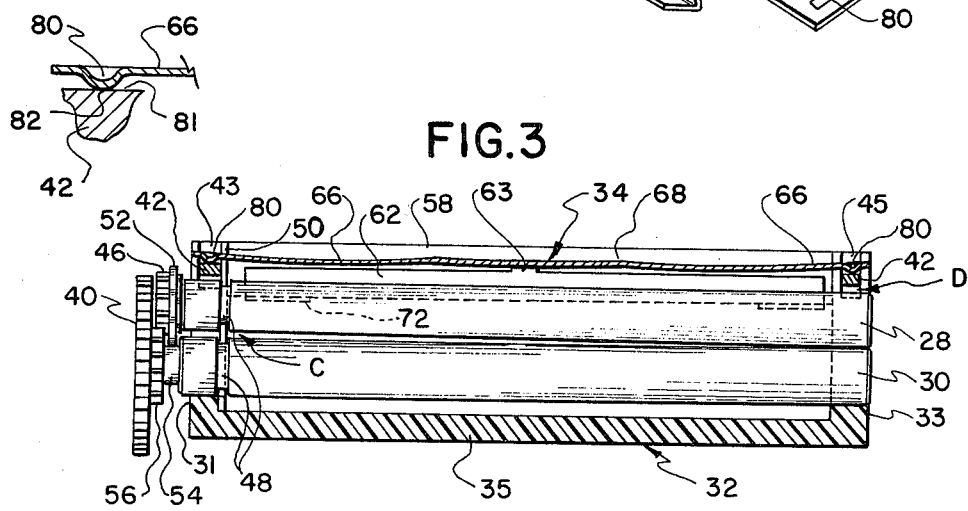

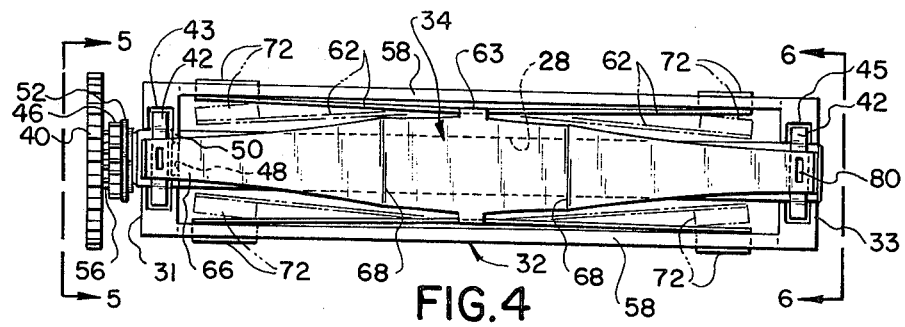
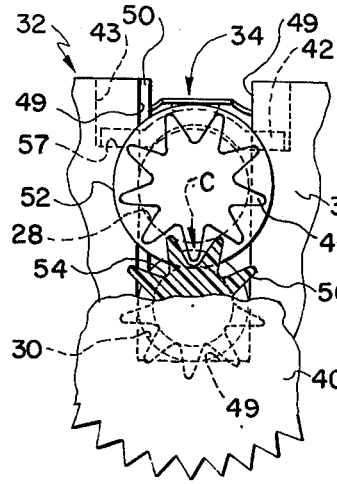
FIG. 5
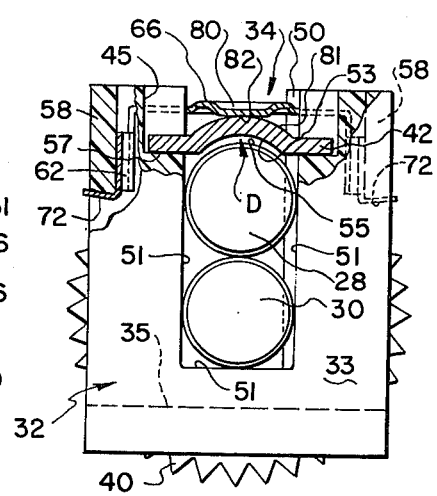
FIG. 6
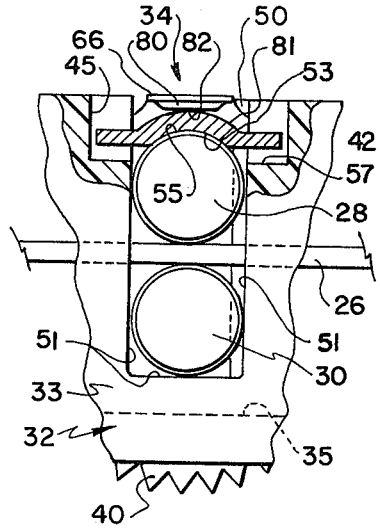
FIG. 8
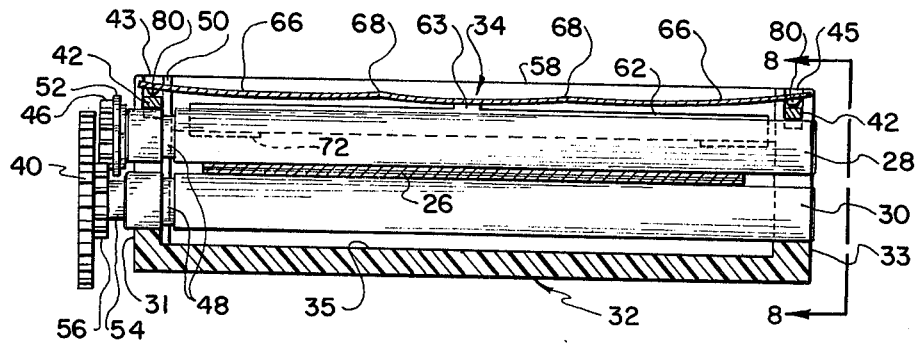
FIG. 7

PRESSURE ROLLER ASSEMBLY FOR SELF PROCESSING CAMERA

BACKGROUND OF THE INVENTION

1. Field of the Invention

This invention relates generally to cameras adapted to use self developing film units that are successively exposed and then processed by being transported through a pressure applying assembly, and specifically to an improved pressure applying assembly for such a camera.

2. Description of the Prior Art

In a self-processing camera of the type to which the present invention relates, a multi-layered self developing film unit incorporating a multi-layered image receiving portion and a rupturable pod containing developing fluid is exposed in the camera and then advanced through a pressure applying assembly for developing. Pressure exerted by pressure applying members ruptures the pod containing the developing fluid and causes the fluid to flow between the layers of the image receiving portion to develop the image.

Pressure applying assemblies typically include a pair of elongate pressure applying members such as rollers held in a frame so that a certain amount of radial movement between the rollers is possible. The rollers are urged toward each other by means of a suitable spring. Once the exposed film unit is advanced into the nip formed by the rollers, continued movement of the film unit between the rollers spreads the fluid between the layers of the film unit. To obtain optimum development of the image, it is very critical that the developing fluid be spread evenly between the layers of the film unit throughout the image area. An important consideration in achieving even spreading of the developing fluid is that the pressure exerted by the pressure applying members be equally distributed across the width of the film unit as it is transported through the assembly.

Another important consideration in the design of a pressure applying assembly is its manufacturability. Ideally, the assembly must be easy to assemble, contain as few parts as possible, and require a minimum number of fine tolerances.

A good deal of the effort in designing pressure applying assemblies has gone into design of the spring or springs which yieldably urge the pressure applying members together. One approach has been to use a pair of U-shaped springs, one spring on either end of the pressure applying members, the members being retained between the arms of the U. Although this design has the advantage of ease of assembly, i.e., the forces of the springs are used to hold the members in the frame, the manufacturing tolerances of the forces exerted by the springs are quite critical since the springs must exert nearly equal force on the ends of the pressure applying members for even spreading of the developing fluid between layers in the film unit. It can be seen that if one of the springs were to exert more pressure on one end of the members than on the other, the distribution of developing fluid on that side of the film unit would be much thinner than on the other side resulting in uneven development of the image.

Another arrangement known in the art which automatically overcomes the disadvantages of unequal forces on the end of the pressure applying members is the use of a bow shaped spring, the ends of the spring being urged against the ends of one of the members by a force exerted on the center of the bow. Typically, the bow shaped spring is held against the pressure applying members by means of a part of the camera body or a part of the frame bearing on the central portion of the spring. The spring is held in position so that it can experience some rocking motion to thereby equalize the forces exerted by both ends of the spring. Although this arrangement has the advantage of automatically equalizing the spring forces on the ends of the pressure applying members, it suffers from the fact that it is not as easily assembled as the aforementioned configuration utilizing the U-shaped springs. Additionally, a very rigid frame or camera body must be provided to sustain the force exerted by the center of the bow-shaped spring against the frame or body of the camera.

SUMMARY OF THE INVENTION

An improved pressure applying assembly is provided according to the present invention wherein a pair of pressure rollers are supported within a frame having open ended slots for receiving the ends of the rollers and maintaining the rollers in substantially parallel relationship. Radial movement of the rollers away from each other is yieldably resisted by a bow-shaped spring that is held in the frame by a pair of arms attached to the central portion of the spring, one arm on either side of the spring. The arms are flexible in a direction perpendicular to the direction of flex of the spring and substantially inflexible in a direction parallel to the flex of the spring. The ends of the arms are adapted to engage the frame at points near the ends of the rollers to hold the spring in the frame.

In a preferred embodiment of the invention, the rollers are allowed to have a maximum uninhibited radial movement relative to each other before the top roller contacts a pair of bearing blocks adapted to be engaged by the ends of the roller when the maximum uninhibited movement has been exceeded. The bearing blocks are disposed in the roller receiving slots in the frame and are held in the slots under tension exerted by the ends of the spring. The ends of the spring bear against the bearing blocks at a point of contact defined by a convex cylindrical surface of the ends of the arms intersecting perpendicularly a convex cylindrical surface on the bearing blocks.

BRIEF DESCRIPTION OF THE DRAWINGS

In the detailed description of the preferred embodiment of the invention presented below, reference is made to the accompanying drawings wherein like reference numerals denote like elements and wherein:

FIG. 1 is a perspective view of a self-processing camera having a portion thereof broken away to reveal a pressure roller assembly according to the present invention;

FIG. 2 is a perspective view of the spring from the pressure roller assembly;

FIG. 3 is a sectional view of the pressure roller assembly of FIG. 1 taken along Line 3—3;

FIG. 4 is a plan view of the pressure roller assembly;

FIG. 5 is a partial view of the end of the pressure roller assembly indicated by the Line 5—5 in FIG. 4;

FIG. 6 is a view of the end of the pressure roller assembly indicated by the Line 6—6 in FIG. 4, partially broken away to reveal the seating of one of the bearing blocks;

FIG. 7 is a view similar to FIG. 3 showing a cross-section of the pressure roller assembly when a film unit is present between the rollers;

FIG. 8 is a view of the end of the pressure roller assembly indicated by Line 8—8 of FIG. 7;

FIG. 9 is an enlarged cross-sectional detail of the point contact between the spring and bearing block of FIG. 6; and FIG. 10 is an enlarged cross-sectional detail of the point contact between the spring and bearing block of FIG. 3.

DESCRIPTION OF THE PREFERRED EMBODIMENT

Because photographic cameras are well known, the present description will be directed in particular to elements forming part of, or cooperating more directly with, the present invention, camera elements not specifically shown or described herein being understood to be selectable from those known in the art.

As indicated previously, the present invention forms a part of a camera 12 of the type adapted to expose and process self-developing film units. The camera 12 illustrated in FIG. 1 of the drawings is basically composed of a light-tight camera body 14 which is provided with a latchable hinged loading door 16 and a forwardly projecting extension 18 supporting a camera lens 20 and a shutter assembly housing 22. The pressure roller assembly to which the present invention is directed, generally designated 24, is located within and supported by the camera body 14.

The hinged loading door 16 on the back of the camera body can be opened for the camera to receive a pack of self-developing film units, not shown. After one of the self-developing film units has been exposed in the camera, it is urged by a mechanism not shown to the pressure roller assembly 24 for processing. The film unit is advanced through the pressure roller assembly to initiate development of the image. A film unit 26 which has been partially advanced through the pressure roller assembly 24 is shown emerging through a slot, not shown, in the side of the camera. Further details of the pressure roller assembly will be described hereinafter with reference to FIGS. 2 through 10. For present purposes, however, it will be sufficient to explain that the pressure roller assembly includes a pair of juxtaposed rotatable rollers 28 and 30 which are held in a frame 32 by a spring 34.

The self-developing film unit is of a multi-layered construction incorporating a rupturable pod containing developing fluid. After the film unit is exposed in the camera, it is advanced into the nip formed by rollers 28 and 30. The rollers are urged toward each other by means of spring 34 to apply pressure on the film unit. Once the exposed film unit is in the nip formed by the rollers, rotation of one or both of the rollers continues the movement of the film unit between the rollers thereby rupturing the pod and spreading the developing fluid between the layers of the film unit.

Rotation of the rollers is accomplished either manually by means of an external crank (not shown) or by a suitable motor (not shown) driving gear 38.

Reference is now made to FIGS. 2 through 6 which more clearly show the details of the pressure roller assembly 24. As shown therein, the pressure roller assembly 24 includes a frame 32, a pair of rollers 28 and 30, a pair of bearing blocks 42, a bow-shaped leaf spring 34, and a pair of gears 40 and 46.

Rollers 28 and 30 are substantially identical, each having an annular groove 48 near one end. The frame 32 that holds the rollers in juxtaposed relationship has a base portion 35 slightly shorter than the length of the rollers 28 and 30 and two end portions 31 and 33 perpendicular to the base portion having U-shaped slots 49 and 51 therein for rotatably receiving the ends of the rollers. A rib 50 on the inside edge of one of the slots engages the annular grooves 48 of the rollers to prevent longitudinal motion of the rollers in the frame. When rotatably mounted in the frame, the rollers are free to undergo radial displacement from one another.

Bearing blocks 42 are received in recesses 43 and 45 in the frame and cover the open ends of the U-shaped slots 49 and 51. As best shown by FIGS. 6 and 8, the bearing blocks have a concave cylindrical surface 53 that is complementary to the cylindrical surface 55 of the pressure roller 28 and is adapted to be engaged by pressure roller 28. The bearing blocks rest on the bottom surface 57 of the recesses 43 and 45 in the end portions of the frame and are out of contact with rollers 28 when there is no film unit between the rollers. Thus, there is a maximum unimpeded radial displacement possible between the two rollers before the ends of roller 28 contact bearing blocks 42. The only critical tolerance in manufacturing the frame 32 for maintaining this maximum unimpeded radial displacement is the distance from the bottom of the U-shaped slots 49 and 51 to the bottoms 57 of recesses 43 and 45.

Referring now to FIG. 2, bow-shaped spring 34 may be stamped from a flat sheet of spring material to form three substantially parallel strips, the two outside strips 62 being connected to the center strip 66 by narrow bridges 63 of material. The bridges 63 are bent so that the two outside strips 62 form a pair of arms that are substantially parallel to the center strip 66 and are flexible in a direction perpendicular to the flex of the center strip and are substantially inflexible in a direction parallel to the flex of the center strip 66. The ends of the center strip 66 are bent down slightly along lines 68 to result in a generally bow-shaped leaf spring. The ends of arms 62 are bowed slightly away from center strip 66 for reasons to be explained in the following paragraph. A portion of each end of arms 62 are bent at slightly less than right angles to the arms to form tabs 72.

As best illustrated in FIG. 4, a pair of ribs 58 connect the opposite corners of the end portions 31 and 33 of frame 32. As shown in FIG. 6, the undersides of ribs 58 slope slightly upwards away from the rollers. Bow-shaped spring 34 is held under tension in frame 32 by hooking tabs 72 under ribs 58, the upward slope of the underside of ribs 58 cooperating with the slightly acute angle of the tabs to securely retain the tabs under the ribs. As seen in FIG. 4, the slight outward bow of arms 62 also helps to insure that tabs 72 remain under ribs 58 and will resist displacement when the assembly is subjected to mechanical shocks. When assembled, the ends of the bow-shaped center portion 66 of spring 34 exert equal forces against bearing blocks 42. Since the points where tabs 72 hook under ribs 58 are near where the ribs join the end portions 31 and 33 of frame 32, the ribs can be relatively thin and still support a good deal of force. Also, because the force of the spring 34 is equally distributed to four points of the frame, the total force that must be born by any part of the frame is relatively small thus allowing the frame to be constructed out of material such as molded plastic.

When pressure rollers 28 and 30 are mounted in frame 32 and bearing blocks 42 are positioned in their recesses, spring 34 is easily assembled in the frame by flexing the ends of arms 62 towards each other so that tabs 72 clear ribs 58 of frame 32, arms 62 now being in the position indicated in phantom in FIG. 4. The bow-shaped spring is then forced against the bearing blocks 42 until arms 62 can be released to catch tabs 72 under the ribs 58. The total force of the spring 34 pressing against bearing blocks 42 is thus distributed equally to frame 32 among the four points where tabs 72 hook under ribs 58.

As seen from the above description, the assembled pressure roller assembly is held together by spring 34 and can be handled as a unit during assembly of the camera with no danger of losing any parts from the roller assembly.

As shown in FIG. 2, semi-cylindrical dimples 80 are embossed in the ends of bow-shaped springs 34, the cylindrical axes of the dimples running perpendicular to the longitudinal axis of the spring. The tops of bearing blocks 42 have cylindrical surfaces 81 that are perpendicular to the cylindrical surfaces of the dimples 80. Thus, the ends of the spring always contact the bearing blocks substantially at a point 82, shown in detail in FIGS. 9 and 10, so that the bearing blocks will evenly engage the surface of roller 28 regardless of the angle at which the ends of the spring encounter the bearing blocks.

As illustrated in FIG. 3, if desired, minimum clearance C (less than the thickness of a film unit) can be maintained between one end of the rollers 28 and 30 by means of a discshaped projection 52 which extends radially beyond roller 28 and engages an extension 54 of roller 30. The minimum clearance thus established protects the surface finish of the rollers by preventing the rollers from contacting one another when the camera is jarred. This minimum clearance, as shown in FIG. 5, also serves to protect the teeth of gear 46 attached to roller 28 from bottoming out against the teeth of gear 56 attached to roller 30.

As shown in FIG. 6, rollers 28 and 30 are free to move radially away from each other a certain unimpeded distance D before roller 28 contacts the bearing blocks. This distance D is slightly greater than the clearance C established between one end of rollers 28 and 30 and enables the film unit to more easily enter the nip of the rollers. As shown in FIGS. 7 and 8, when a film unit 26 is between rollers 28 and 30, the bearing blocks no longer rest on the ledges 57 but transmit the full force of spring 34 to roller 28. Also, disc-shaped projection 52 no longer contacts extension 54 of roller 30.

Equal force is maintained by bow-shaped spring 34 on bearing blocks 42 because the center strip portion 66 of spring 34 is relatively free to twist slightly on the narrow bridges 63. Because the narrow bridges 63 provide relatively little resistance to slight rotations of the center strip 66 about an axis passing through the narrow bridges, manufacturing tolerances on the parallelism of arms 62 and center strips 66 are not critical.

The invention has been described in detail with particular reference to a preferred embodiment thereof, but it will be understood that variations and modifications can be effected within the spirit and scope of the invention.

We claim:
1. A pressure applying assembly for use in self-processing cameras to process self-developing film units, comprising:

a. a pair of elongate pressure applying members between which the self-developing film unit is passed to initiate developing;
b. means for retaining said pressure applying members in substantially parallel alignment while allowing some relative displacement away from each other;
c. a spring for yieldably resisting such displacement of one of said pressure applying members relative to the other, said spring having three substantially parallel strips connected near their centers by relatively narrow bridges of spring material, said narrow bridges being bent so that the two outside strips form arms that are flexible in a direction generally perpendicular to the flex of the center strip and substantially inflexible in a direction parallel to the flex of said center strip, and
d. cooperating means on the ends of said arms and on said retaining means for holding said spring in position relative to said pressure applying members and said retaining means, such that the end portions of said center strip are positioned to yieldably resist displacement of said one pressure applying member.

2. The invention of claim 1 wherein at least one of said pair of elongate pressure applying members comprises a cylindrical roller.

3. The invention of claim 1 wherein said retaining means includes an elongate base member, a pair of end portions connected to said base member and having openings therein for receiving the ends of said elongate pressure applying members; and said cooperating means comprises a pair of ribs connecting the end portions of said retaining means, one rib disposed on either side of the openings therein, and an outwardly extending tab on each end portion of each of said arms, said tabs being adapted to engage the underside of said ribs to hold said spring in position relative to said pressure applying members and said retaining means;

whereby said spring may be installed in said retaining means by flexing the arms of said spring inwardly until said tabs clear said ribs, placing said spring in position relative to said pressure applying members and said retaining means, and releasing said arms so that said tabs engage the underside of said ribs.

4. The invention of claim 3 wherein said pair of elongate pressure applying members comprise a pair of cylindrical rollers; and said openings in said end portions of said retaining means comprise generally U-shaped slots for rotatably receiving the ends of said cylindrical rollers.

5. The invention of claim 4 including a pair of bearing blocks, one block covering the open end of each of said U-shaped slots and disposed between one end of said bow-shaped leaf spring and the corresponding end of one of said rollers, said bearing blocks being adapted to be engaged by said one of said rollers when a certain maximum relative radial displacement between said rollers has been exceeded, the ends of said bow-shaped spring contacting said bearing blocks to urge them toward said one roller.

6. The invention of claim 5 wherein the surface of said bearing blocks which is contacted by the ends of said spring is a convex cylindrical surface, and the ends of said spring have convex cylindrical surfaces which are substantially perpendicular to the cylindrical surfaces on the bearing blocks so that the ends of said spring contact said bearing blocks substantially at a point.

* * * * *